Feb. 13, 1940.  M. VAN RAALTE  2,190,052
VEHICULAR BRAKE
Filed Oct. 4, 1937
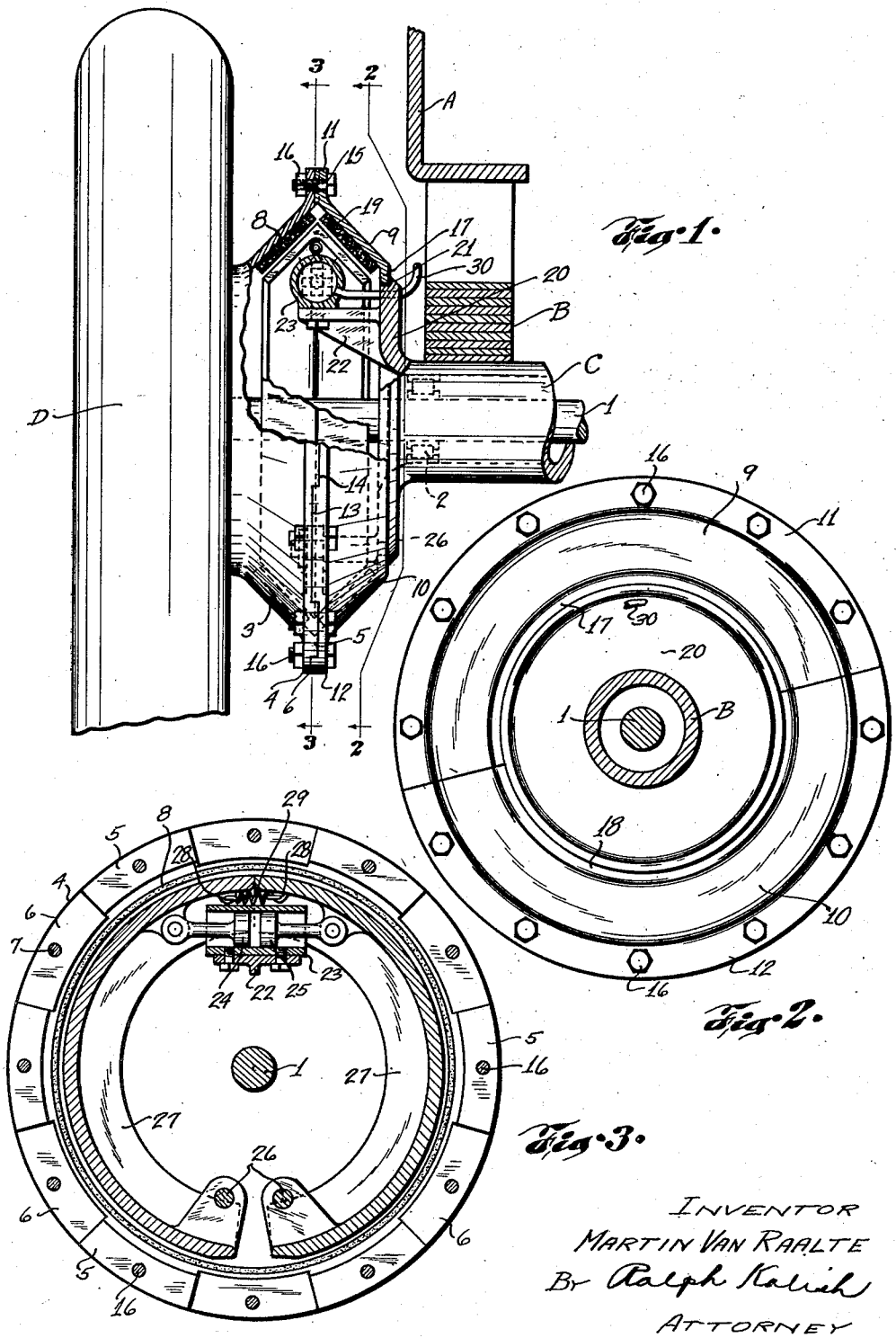
INVENTOR
MARTIN VAN RAALTE
By Ralph Kalish
ATTORNEY Patented Feb. 13, 1940

2,190,052

UNITED STATES PATENT OFFICE 2,190,052

VEHICULAR BRAKE

Martin Van Raalte, St. Louis, Mo.

Application October 4, 1937, Serial No. 167,083

2 Claims. (Cl. 188—78)

This invention relates to certain new and useful improvements in vehicular brakes and has for its principal objects the provision of a vehicular brake which is exceptionally simple in construction and operation, which provides a substantially increased amount of braking surface with a relatively limited displacement, which may be unhoused for repair or inspection in an unusually simple time-saving and efficient manner, which is less subject to overheating, dragging, and other types of inherent mechanical difficulty, which is much more readily sealed against the unauthorized entry of dirt and other foreign particles, and which is otherwise highly efficient in the performance of its stated functions.

And with the above and other objects in view, my invention resides in the novel features of form, construction, arrangement, and combination of the several parts presently described and pointed out in the claims.

In the accompanying drawing—

Figure 1 is a front elevational view, partly broken away and in section, of a vehicular brake constructed in accordance with and embodying my present invention; and Figures 2 and 3 are vertical sectional views of the vehicular brake, taken approximately along the lines 2—2 and 3—3, respectively of Figure 1.

Referring now in more detail and by reference characters to the drawing, which illustrates a preferred embodiment of my present invention, A designates a portion of a conventional automobile chassis to which is affixed in the usual manner an axle-supporting spring B carrying the axle housing C. Disposed within the axle housing C, is a conventional axle shaft or spindle 1 rotatively mounted in the usual manner within the roller bearing 2. Rigidly mounted on the extended end of the shaft 1 for rotation therewith, is the vehicle wheel D provided on its inner face with a frustro-conical drum member 3 mounted concentrically about the shaft 1 for rotation with the wheel.

The drum member 3 is provided along its outer margin with a preferably integrally formed annular flange 4 provided on its outwardly presented flat face wth a series of uniformly spaced outwardly presented shoulders 5. The shoulders 5 are preferably of such a shape and size and are so arranged with respect to each other around the circumference of the flange 4 so as to divide the flange into an equal number of similarly sized and shaped shoulders 5 and depressions 6, the flange 4 being further provided with an annular series of apertures 7, each of which is preferably positioned centrally of one of the shoulders 5 or one of the depressions 6.

Rigidly mounted on the inner frustro-conical face of the drum 3, is an annular brake band or lining 8, which may be formed of any conventional brake lining material.

Removably mounted on the brake drum 3, is a pair of companion brake shell members 9, 10, each being semi-circular in character and adapted to fit snugly along their diametrical margins in the formation of a second frustro-conical brake member similar in shape and character to the frustro-conical brake drum 3 and being provided with annular flanges 11, 12, of similar shape and arrangement to the flange 4. The flanges 11, 12, are provided with a plurality of upstanding shoulders 13 and depressions 14, similar in shape and arrangement to the shoulders 5 and depressions 6 of the shell member 3, for interfitting or interlocking engagement therewith, the flanges 11 and 12 further being provided with an annular series of apertures 15 in registration with the annular series of apertures 7 of the drum flange 4 for receiving a plurality of fastening bolts 16, all as best seen in Figures 1 and 2 and for purposes presently more fully appearing.

The brake shell sections 9, 10, are also provided at their free margins with radially inwardly and matching semi-circular flange portions 17, 18, and on their inner frustro-conical faces provided with brake band segments 19 formed of any conventional brake lining material and arranged in symmetrical juxtaposition to the brake band 8.

The axle housing C at its outer end is provided with a preferably integrally formed outwardly flaring circular plate member 20 machined along its outer circumferential edge with an annular groove 21 complementary in shape to, and for snug slidable engagement with, the flanges 17, 18, of the brake shell members 10, 11, as best seen in Figure 1.

The rigid plate 20 is also preferably integrally provided on its inner face with an outwardly extending bracket member 22 on which is mounted a dual acting hydraulic cylinder 23 provided with oppositely moving pistons 24, 25. The plate 20 is also provided with a pair of parallel outwardly extending pivot studs 26, all as best seen in Figures 1 and 3 and for purposes presently more fully appearing.

Swingably mounted on the pivot studs 26, is a pair of opposed semi-circular brake shoes 27 each having an outwardly presented circumferential surface of V-shape cross-section complementary in shape to the combined contour of the brake drum 3 and the associated brake shells 10, 11, and being at their other ends pivotally connected to the pistons 24, 25, respectively. The brake shoes 27 are also provided with apertured bosses 28 for receiving a tension spring 29 connected at its ends to the bosses 28 and extending therebetween for normally holding the brake shoes 27 resiliently out of engagement with the brake linings 8, 19. The brake shoe segments 27 are so constructed that the various radii of its effective braking surface are slightly greater than the corresponding radii of the face of the brake lining, so that when the brake shoes have been moved outwardly under braking pressure into operative engagement with the brake lining, the entire brake shoe will conform circularly to the brake lining so as to have even uniform braking pressure between the brake shoes and the lining throughout the effective areas thereof. In other words, the braking surfaces of the brake shoe segments 27 are so shaped that they are non-concentric with respect to the brake drum when in disengaged position and are truly concentric therewith when in engaging position.

The hydraulic cylinder 23 is connected in any conventional manner, as by means of the pipe 30, to a suitable hydraulic operating system of any type commonly used on present day vehicles.

In operation, when the brake pedal of the automobile or other operative device is depressed, the pistons 24 will move outwardly away from each other in the cylinder 23 against the action of the tension spring 29, urging the brake shoes 27 into operative braking engagement with the brake linings 8, 19, of the brake drum and thereby arresting forward motion of the vehicle. It will be evident that the entire effective area of the brake shoes and brake lining will come into engagement for braking operation in a smooth uniform manner and there will be no tendency for the brake to grab at certain points to the exclusion of other portions of the brake. Furthermore, this present brake will not tend to "wrap up" upon itself, such as, for example, is true of the so-called self-energizing brake, thereby avoiding the tendency in the case of automobiles and similar vehicles of producing a sort of nose-dive action, which is at present considered highly undesirable.

It will be evident that the present brake is entirely sealed against the entrance of deleterious and injurious foreign matter and yet may be readily opened up for inspection by merely removing a series of the bolts 16 and lifting off either one or both of the brake shells 10, 11, as may be necessary. This permits exceptionally accurate and efficient brake adjustment and brake repair. It will further be evident that a much larger effective braking area can be obtained in a brake of any given size and a greater area will be exposed to the atmosphere for the dissipation of heat of friction generated during braking operation. Finally, it will be seen that the braking operation itself is much more efficient in the present type of brake by reason of the fact that, in addition to the simple type of face-wise friction, there is also a considerable amount of transverse or squeezing pressure which results from the V-shaped cross-section of the brake shoe and brake lining arrangement in the present invention.

It will be understood that changes and modifications in the form, construction, arrangement, and combination of the several parts of the brake may be made and substituted for those herein shown and described without departing from the nature and principle of my invention.

Having thus described my invention, what I claim and desire to secure by Letters Patent is—

1. In a vehicular brake structure, an outer brake drum member of substantially frusto-conical shape having a radially outwardly flared annular flange around its outwardly presented margin, an inner brake drum structure of substantially frusto-conical shape composed of two substantially hemi-circular segmental portions separably fitted together and having radially outwardly flared annular flange portions around the outwardly presented margins to fit against the similar flange on the outer drum member, brake lining portions on the brake drum faces of the outer drum member and the brake faces of the two segmental drum members, fastening means engaging the flange of the outer brake drum member and the flanges of the two inner segmental brake drum members and connecting the outer and inner portions of the brake drum together whereby the two segmental brake drum members are independently and separably connected to the outer brake drum member, and expansible brake shoe means within the brake drum structure having outwardly presented circumferential surfaces of substantially V-shaped cross section complementary in shape to the combined contour of the brake lining portions of the outer and inner brake drum members.

2. In a vehicular brake structure, an outer brake drum member of substantially frusto-conical shape having a radially outwardly flared annular flange around its outwardly presented margin, an inner brake drum structure of substantially frusto-conical shape composed of two substantially hemi-circular segmental portions separably fitted together and having radially outwardly flared annular flange portions around the outwardly presented margins to fit against the similar flange on the outer drum member, brake lining portions on the brake drum faces of the outer drum member and the brake faces of the two segmental drum members, said outer brake drum member and the two inner segmental brake drum members being provided on the adjacent faces of the annular flanges thereof with circumferentially spaced and substantially radially extending lug-like outwardly projecting protuberances and correspondingly shaped intervening recesses whereby the protuberances of the outer drum member fit within the recesses of the inner drum structure to locate the segmental drum members in predetermined relative position and retain the several members against relative lateral and rotational movement, fastening means engaging the flange of the outer brake drum member and the flanges of the two inner segmental brake drum members and connecting the outer and inner portions of the brake drum together whereby the two segmental brake drum members are independently and separably connected to the outer brake drum member, and expansible brake shoe means within the brake drum structure having outwardly presented circumferential surfaces of substantially V-shaped cross section complementary in shape to the combined contour of the brake lining portions of the outer and inner brake drum members.

MARTIN VAN RAALTE.